USO10345482B2

United States Patent
Xu et al.

(10) Patent No.: US 10,345,482 B2
(45) Date of Patent: Jul. 9, 2019

(54) GLOBAL GRID BUILDING UNFAULTING SEQUENCE FOR COMPLEX FAULT-NETWORK TOPOLOGIES

(71) Applicant: Landmark Graphics Corporation, Houston, TX (US)

(72) Inventors: Zitao Xu, Katy, TX (US); Genbao Shi, Sugar Land, TX (US); Chikang David Chien, Sugar Land, TX (US); Jeffrey Yarus, Houston, TX (US); Richard L. Chambers, Yukon, OK (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 120 days.

(21) Appl. No.: 14/913,883

(22) PCT Filed: Nov. 26, 2013

(86) PCT No.: PCT/US2013/071933
§ 371 (c)(1),
(2) Date: Feb. 23, 2016

(87) PCT Pub. No.: WO2015/080699
PCT Pub. Date: Jun. 4, 2015

(65) Prior Publication Data
US 2016/0216403 A1 Jul. 28, 2016

(51) Int. Cl.
*G01V 99/00* (2009.01)
(52) U.S. Cl.
CPC ................... *G01V 99/005* (2013.01)
(58) Field of Classification Search
None
See application file for complete search history.

(56) References Cited

U.S. PATENT DOCUMENTS 8,600,708 B1 * 12/2013 Mallet .................... G06T 17/05
703/2
8,743,115 B1 * 6/2014 Mallet .................... G01V 1/302
345/424

(Continued)

FOREIGN PATENT DOCUMENTS

WO WO-2008150325 A1 12/2008
WO WO-2015080699 A1 6/2015

OTHER PUBLICATIONS

Qu, Dongfang, et al. "A Method for Generating Volumetric Fault Zone Grids for Pillar Gridded Reservoir Models." Computers & Geosciences, vol. 81, 2015, pp. 28-37., doi:10.1016/j.cageo.2015.04.009.*

(Continued)

*Primary Examiner* — J. E. Schoenholtz

(57) ABSTRACT

In various examples, a method includes storing one or more data structures on a storage device, the one or more data structures identifying a plurality of faults in a geographical formation and a plurality of fault blocks on either side of the plurality of faults in the geographic formation; for each pair of faults blocks on opposite sides of a fault identified in the one or more data structures: determining, using at least one processor, a fault polygon of a respective pair of fault blocks with respect to a fault of the plurality of faults; and calculating a matching factor between the respective pair of fault blocks based on the fault polygon; selecting a pair of fault blocks to merge based on the calculated matching factor; and updating the one or more data structures to indicate the selected pair of fault blocks has been merged.

21 Claims, 13 Drawing Sheets

(56) References Cited

U.S. PATENT DOCUMENTS

| | | | |
|---|---|---|---|
| 8,935,141 B2* | 1/2015 | Ran | G06T 17/20 345/419 |
| 9,536,022 B1* | 1/2017 | Tertois | G01V 99/005 |
| 2004/0193960 A1* | 9/2004 | Vassilev | G01V 1/301 714/38.1 |
| 2008/0243454 A1* | 10/2008 | Mallet | G01V 11/00 703/6 |
| 2009/0265152 A1 | 10/2009 | Cacas et al. | |
| 2011/0106507 A1 | 5/2011 | Lepage | |
| 2012/0215513 A1* | 8/2012 | Branets | G01V 99/005 703/10 |
| 2013/0262052 A1 | 10/2013 | Mallet et al. | |

OTHER PUBLICATIONS

Computer Hardware Overview, Feb. 13, 2015 downloaded from URL < http://www.cs.ucr.edu/~gusta/cs8w04/hardware.htm> on May 2, 2018.*
Ning, J., "Open Compute Project, Facebook Server Intel Motherboard V3.1 Rev 1.00" Jan. 6, 2016.*
"International Application Serial No. PCT/US2013/071933, International Search Report dated Aug. 21, 2014", 3 pgs.
"International Application Serial No. PCT/US2013/071933, Written Opinion dated Aug. 21, 2014", 4 pgs.

* cited by examiner

GLOBAL GRID BUILDING UNFAULTING SEQUENCE FOR COMPLEX FAULT-NETWORK TOPOLOGIES

PRIORITY APPLICATIONS

This application is a U.S. National Stage Filing under 35 U.S.C. 371 from International Application No. PCT/US2013/071933, filed on 26 Nov. 2013, and published as WO 2015/080699 A1, on 4 Jun. 2015, which application and publication are incorporated herein by reference in their entirety.

TECHNICAL FIELD

This patent document pertains generally to an unfaulting sequence, and more particularly, but not by way of limitation, to global grid building unfaulting sequence for complex fault-network topologies.

BACKGROUND

Geological faults occur when there has been a fracture along which the blocks of the earth's crust (e.g., fault blocks) on either side have moved relative to one another parallel to the fracture (e.g., the fault plane). By definition, the fault block that is above the fault plane is considered the hanging wall and the fault block that is below the fault plane is defined as the footwall. Different types of faults are classified based on the orientation of the fault blocks. For example, a "normal fault" occurs when the hanging wall moves down relative to the footwall and may occur when there is an expansion of the crust. Alternatively, a "reverse fault" occurs when the hanging wall moves up relative to the footwall and occurs when the crust is compressed. Complex fault topologies may also have cross faults in which two faults cross each other.

BRIEF DESCRIPTION OF DRAWINGS

Some embodiments are illustrated by way of example and not limitation in the figures of the accompanying drawings in which.

DETAILED DESCRIPTION

The following detailed description of the present subject matter refers to subject matter in the accompanying drawings which show, by way of illustration, specific aspects and embodiments (also referred to as examples) in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Geological faults occur when there has been a fracture along which the blocks of the earth's crust (e.g., fault blocks) on either side have moved relative to one another parallel to the fracture (e.g., the fault plane). By definition, the fault block that is above the fault plane is considered the hanging wall and the fault block that is below the fault plane is defined as the footwall. Different types of faults are classified based on the orientation of the fault blocks. For example, a "normal fault" occurs when the hanging wall moves down relative to the footwall and may occur when there is an expansion of the crust. Alternatively, a "reverse fault" occurs when the hanging wall moves up relative to the footwall and occurs when the crust is compressed.

Figure 1:
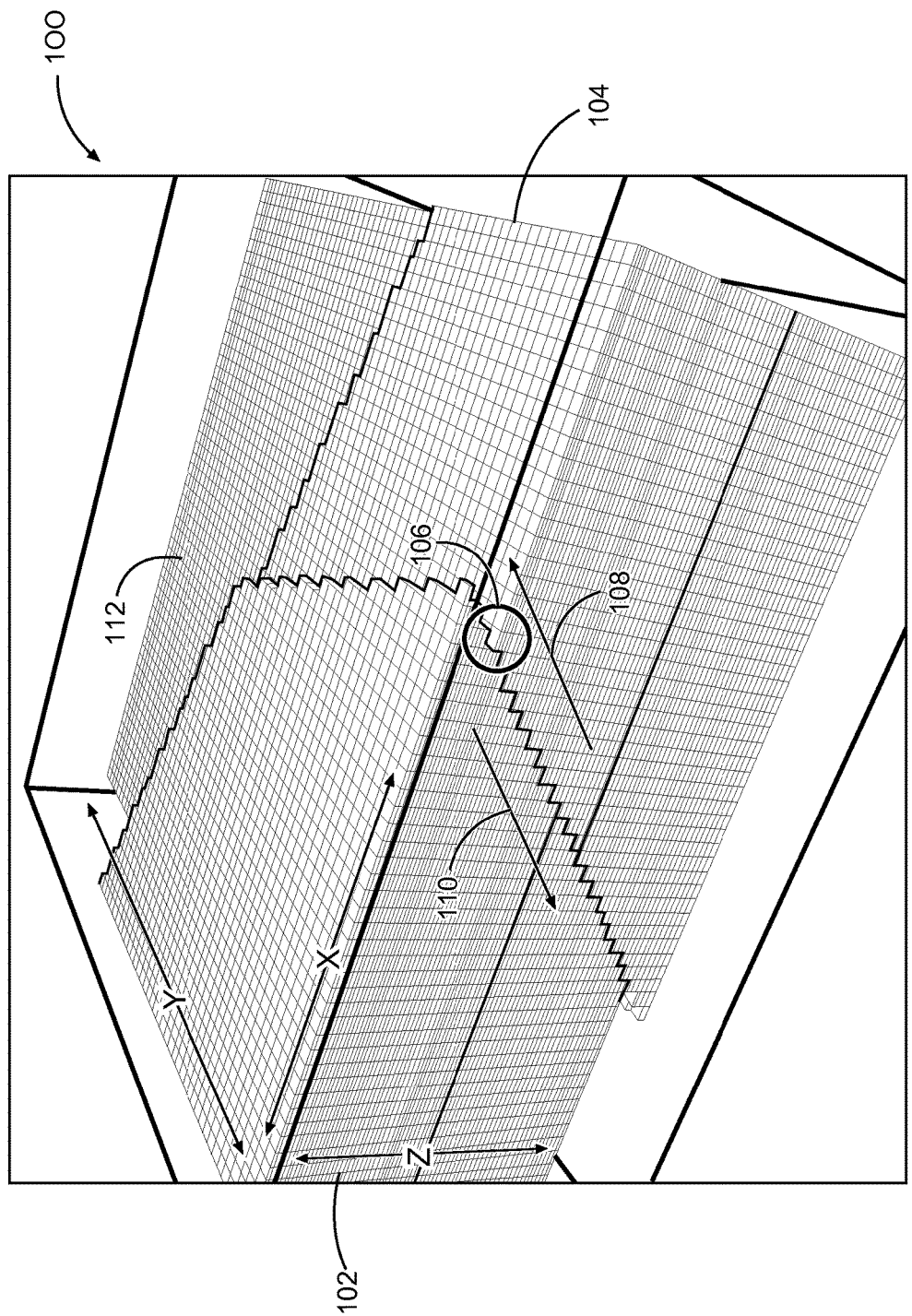
FIG. 1 is a map-view of a geographical formation, according to an example embodiment.

In various examples, a three-dimensional (3D) model may be stored that represents a geographical formation. For example, the model may represent a geographical formation that includes one or more faults and fault blocks. The model may be comprised of an array of cells or any tessellation, regular, or irregular, structured or unstructured, that approximate the geographical formation. For example, there may be a series of stacked planes in the Z (height) direction that each contain a grid of cells in the X-Y direction. Each cell of the grid may have an index of [X, Y, Z]. FIG. 1 represents a visual representation of a stored 3D model (e.g., empty areas and fault blocks).

In addition to a coordinate, each cell in the model may have geographic data associated with the cell. For example, the geographic data may identify a fault block associated with the cell and a type of the fault (e.g., reverse, normal, cross, etc.). In other words, by retrieving the stored geographic data for a cell, an application or user may identify the fault block the cell is a part of, and what type of fault the cell is adjacent to. Geographic data of some cells may indicate that the grid at that position is empty and is not associated with a fault block.

The geographic data and cells in the 3D model may be represented by various data structures. For example a three-dimensional array may be used where each entry in the array stores a data object that represents a cell (I.ea, an entry of [5,5,5] in the array may correspond to position [5,5,5] in the model). The data object may include various data fields that identify the geographic data discussed above. Thus, if a program needs to access what fault block a cell is a part of, the program may access the data object stored in the array that represents the cell in question. Other data structures may also be used without departing from the scope of this disclosure (e.g., each fault block may be have its own data object that defines the boundaries of the fault block within the 3D model).

Additionally, a table or other data structure may be stored that identifies the various fault blocks of the geographic formation. The fault blocks may be identified by an alpha-numerical sequence (e.g., 1, A1, ABC, etc.). The identifier may be what is used when a cell is associated with a fault block. The data on the fault blocks may also identify adjacent faults relative to the fault block.

Similarly, a table or other data structure may be stored that identifies the various faults in the geographic formation. The faults may be identified by an alphanumerical sequence (e.g., 1, A1, ABC, etc.), identify the number of fault blocks adjacent to the fault, and identify the location of the fault between cells of the fault blocks (e.g., identify cells on the sides of the fault for each Z level). The data structures and programs accessing the structures may be implemented in one or more programming languages (e.g., Java, C/C++, etc.) and stored in one or databases (e.g., relational, non-relational, flat file, etc.) or structured files (e.g., XML, etc.).

The 3D model may include more than one representative domain. One domain may be the geometric domain, which when modeled provides an approximate visual representation of the geographic area. Another domain may be a cell index domain. The cell index domain may be a three dimensional area in which the fault blocks may be modeled. A change may be made in the cell index domain, as discussed further herein, but not change the geometric domain. For example, the size of the cell index domain may change from [10, 10, 5] to [12, 10, 5] while leaving the geometric domain unchanged.

In various examples, following the creation of the 3D model based on a geographic formation, cells in reversed faulted areas may have duplicate X-Y coordinates in the cell index domain. For example, in FIG. 1, map-view 100 of a set of geocellular grids is illustrated with a reverse fault of fault block 102 and 104. As shown, at the point where the two fault blocks meet there is overlap between the X-Y coordinates. Accordingly, there may be duplicate cells, with respect to the X-Y coordinates, where the two fault blocks meet (e.g., area 106). This may present problems when building a global grid.

In various examples, an "unfaulting" approach is used to restore the geographic formations to an unfaulted state. In an example, the unfaulting process occurs in the cell index domain only and not in the geometric domain. In other words, the cell geometry may not change after unfaulting, but the grid indices are rearranged. In various examples, fault blocks are the basic units used for unfaulting. An unfaulting operation uses a pair of fault blocks—one from each side of a fault and "moves" them to best align the two blocks, thereby minimizing the fault throws. For example, the alignment process may update cells associated with a pair of fault blocks representing a move of the two blocks in the direction of arrows 108 and 110. After the alignment, the cell indices in any dimension increase monotonically, with no duplication. A stopping condition may be established for the alignment based on a calculated conflict factor (e.g., how far apart various portions of a fault block are with respect to another fault block).

Figure 2A:
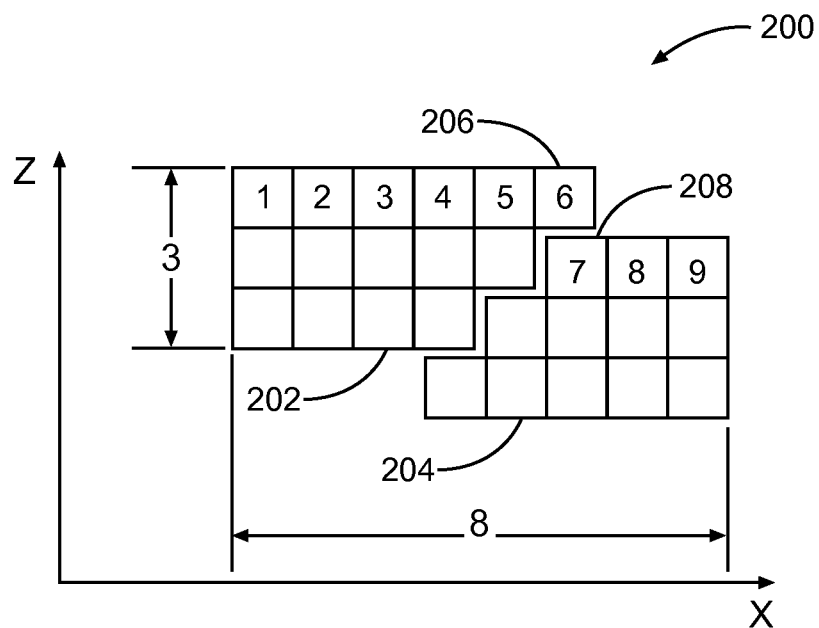
FIGS. 2A and 2B are example geocellular grids, according to various example embodiments.
Figure 2B:
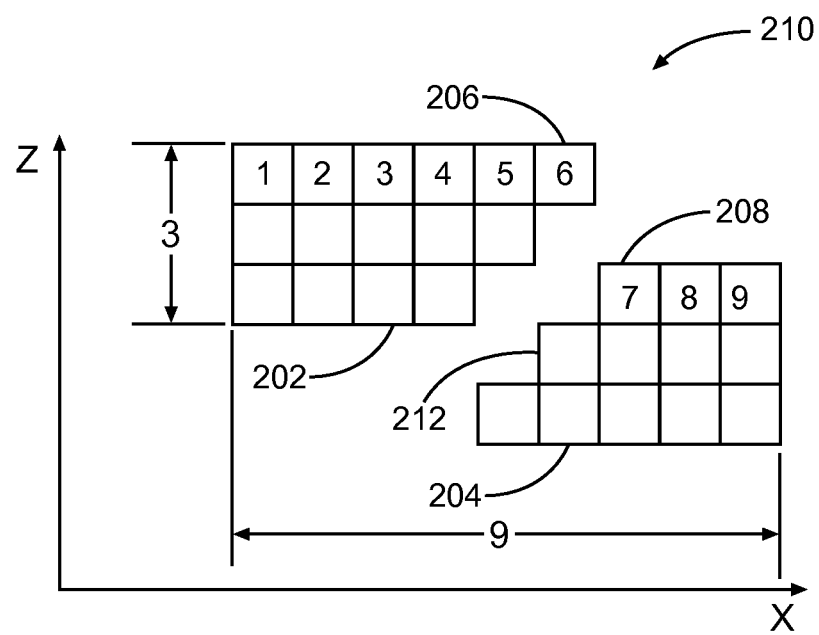

FIGS. 2A and 2B are example geocellular grids (e.g., cell indices), according to various example embodiments. Cell index 200 in FIG. 2A and cell index 210 in FIG. 2B illustrate fault blocks 202 and 204 before and after an unfaulting operation, respectively. The fault blocks have been simplified for illustration purposes of an unfaulting operation and only the X and Z axes are shown. As illustrated cell blocks 206 and 208 have overlapping X coordinates before unfaulting, but do not after unfaulting. In various examples, over-lapping refers to the top level of the footwall (e.g., is there a cell from the hanging wall above the top level of the footwall). Accordingly, even though there is a cell block (e.g., cell block 212) in fault block 204 that shares an X coordinate with cell block 206, this is may not be considered overlap, in an example. Additionally, one can see that grid 210 has been stretched in the X direction to nine cells after unfaulting, whereas the grid remains at three in the Z direction.

In various examples, after completing the unfaulting for one pair of fault blocks, the two blocks are merged to become a single, unfaulted block. For example, a merger of fault blocks identified as 'A' and 'B' in the data structures of the model may result in a new fault block "AB" that includes the geometric data of previous fault blocks 'A' and 'B' and removal of the previous data structures of fault blocks 'A' and 'B'. In the combined fault block, the internal data is structured identically to what is contained in the original fault blocks but may be moved in the X-Y directions during the unfaulting process. Similarly, the geographic data of each cell in fault blocks 'A' and 'B' may be updated to indicate that the cells are now part of fault block "AB". Thereafter, the processes may be repeated recursively to unfauit all of the fault blocks in a fault network until there is a global grid with no fault throws (e.g., one unfaulted block).

Figure 3:
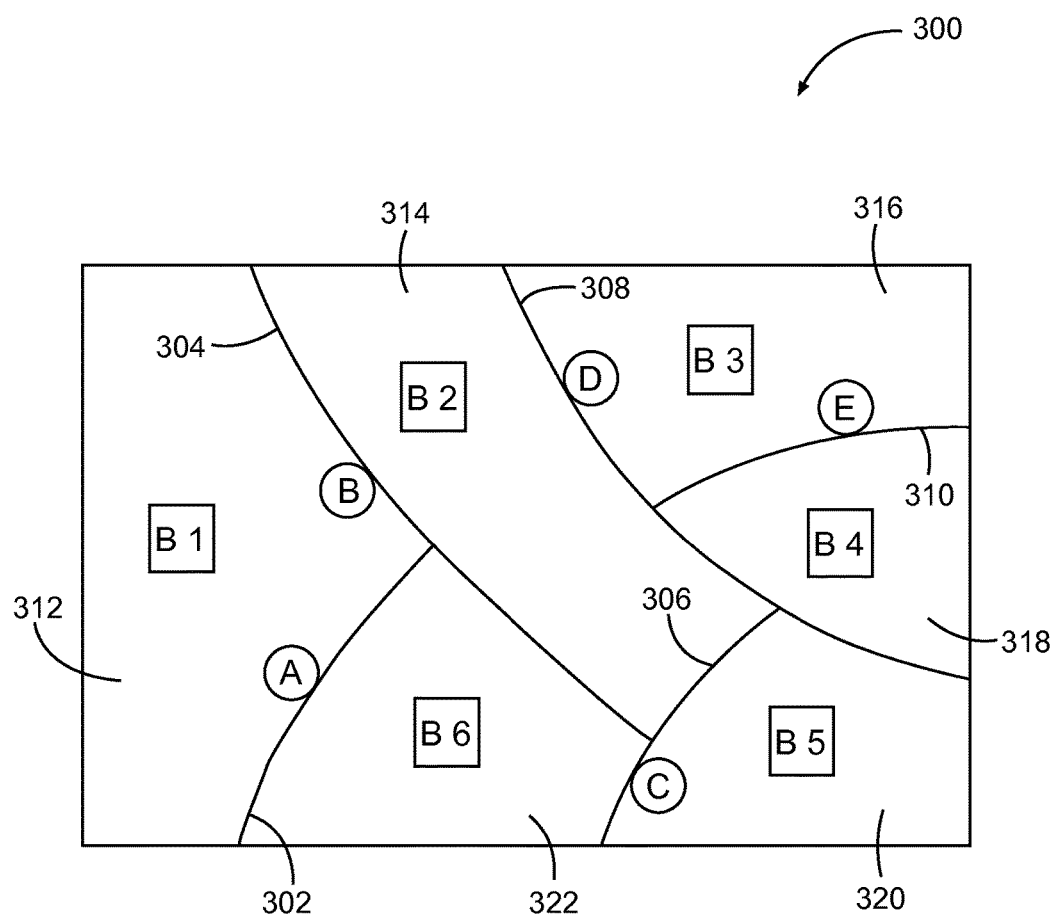
FIGS. 3-5 are fault topologies, according various embodiments.

In various examples, recursive unfaulting of a fault network includes determining a sequence of fault blocks to unfault in the fault network. In some examples, faults may be iterated through to determine faults with only two fault blocks. The fault blocks associated with the identified fault may be merged and unfaulted before applying additional selection rules. For example, FIG. 3 illustrates a simpler fault network 300 with faults 302-310 and fault blocks 312-322. By convention in this disclosure, fault networks are diagrammed with faults labeled with a letter enclosed in a circle and fault blocks labeled with a letter and a number enclosed in a box.

With respect to fault network 300, a "two block" rule may be used to unfault the entire fault network without needing additional rules to determine which pair of fault blocks to select to unfault. For example, the unfaulting sequence may be accomplished in the following order: fault-A (B1, B6), fault-B (B2, b1_b6), fault-E(B3, B4), fault-C(B5, b1_b6_b2), and then fault-D(b3_b4, b1_b6_b2_b5). Other sequences may also be used. For example, fault-E(B3, B4) may be unfaulted before fault-A(B1, B6).

As seen, after each unfaulting, the fault blocks may be relabeled. For example, fault blocks 91 and B6 become fault block b1_b6, in some examples, the data structure(s) that identify the fault blocks may be updated to remove the entries of fault blocks B1 and B6 and enter new fault block b1_b6. For example, the geographic data of cells in the fault blocks represented in the 3D model may be updated to identify the new fault block.

Figure 4:
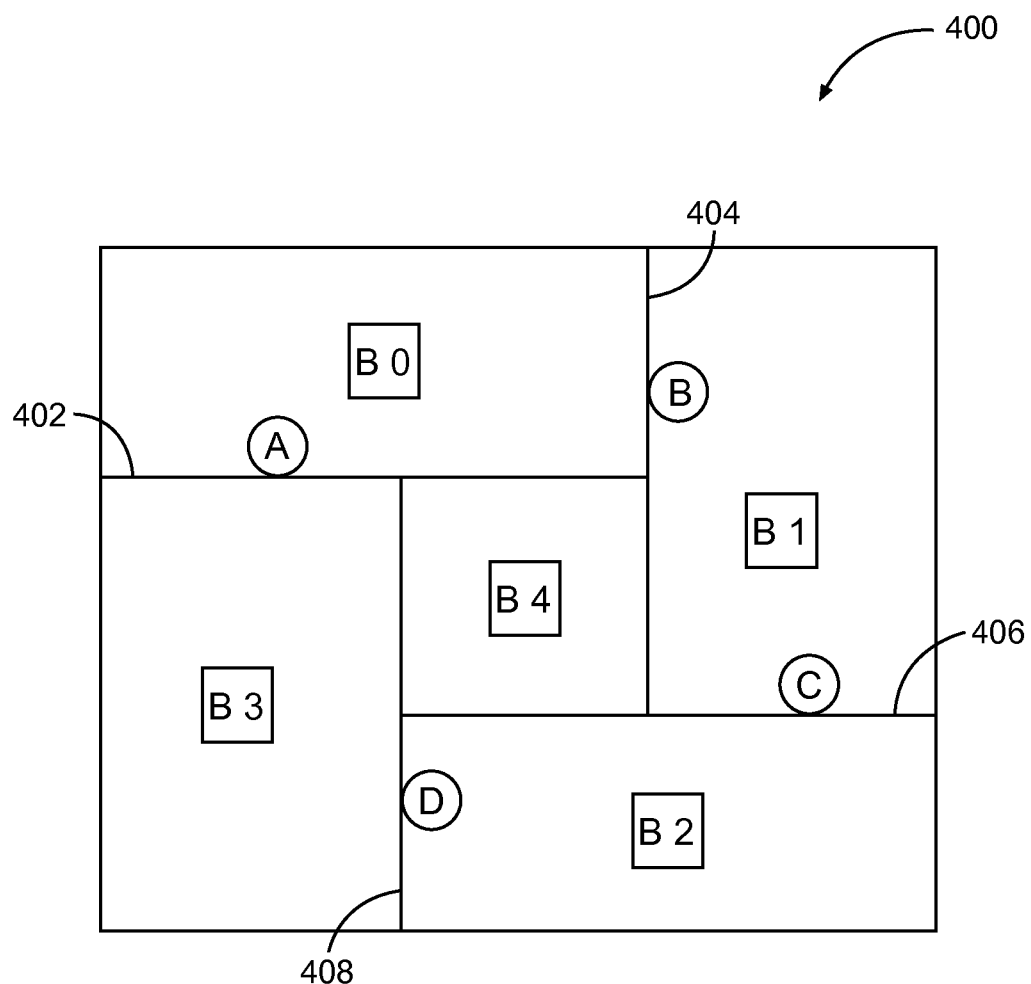
Figure 5:
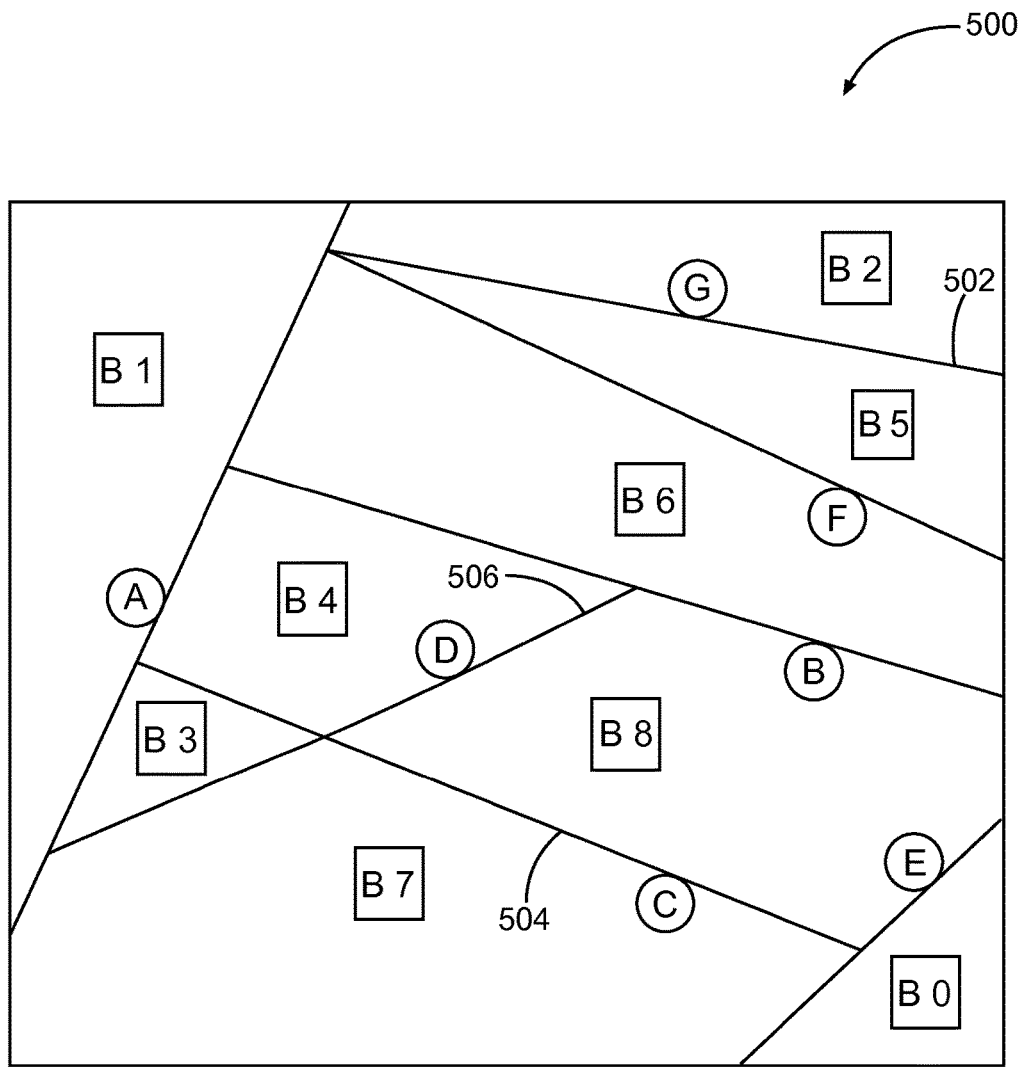

In some examples, a fault network may, in some steps of unfaulting, have a situation in which all faults are associated with more than two blocks. This may exist in an interlocking topology (e.g., FIG. 4) or cross-faulted topology (e.g., FIG. 5). In either situation, it is not possible to choose at random a pair of blocks to perform the unfaulting, which will result in geometric failure, the inability to successfully provide an unfaulted solution using the two-block rule. For example, as illustrated in fault network 400 in FIG. 4, there is no fault among faults 402-408 that only have two fault blocks. Similarly, while some faults in fault network 500 with respect to FIG. 5 have only two fault blocks (e.g., fault 502)

faults 504 and 506 cross each other and cannot be unfaulted using the two-block rule. In such situations, as discussed in more detail below, additional rules may be applied to determine the next pair of fault blocks to unfault.

In various examples, an algorithm used to unfault a more complex fault topology may include the following operations:

1) Choose a fault bounded by two fault blocks only, and then merge this block pair.
2) Repeat step 1 until no faults are bounded by only two blocks.

```
3)    If (no unprocessed blocks) {
          All done
      } else {
          Go step 4
      }
```

4) Use matching criteria globally to choose a pair of blocks, which has the maximum matching factor, and the merge this pair.
5) Go step 1.

Figure 6:
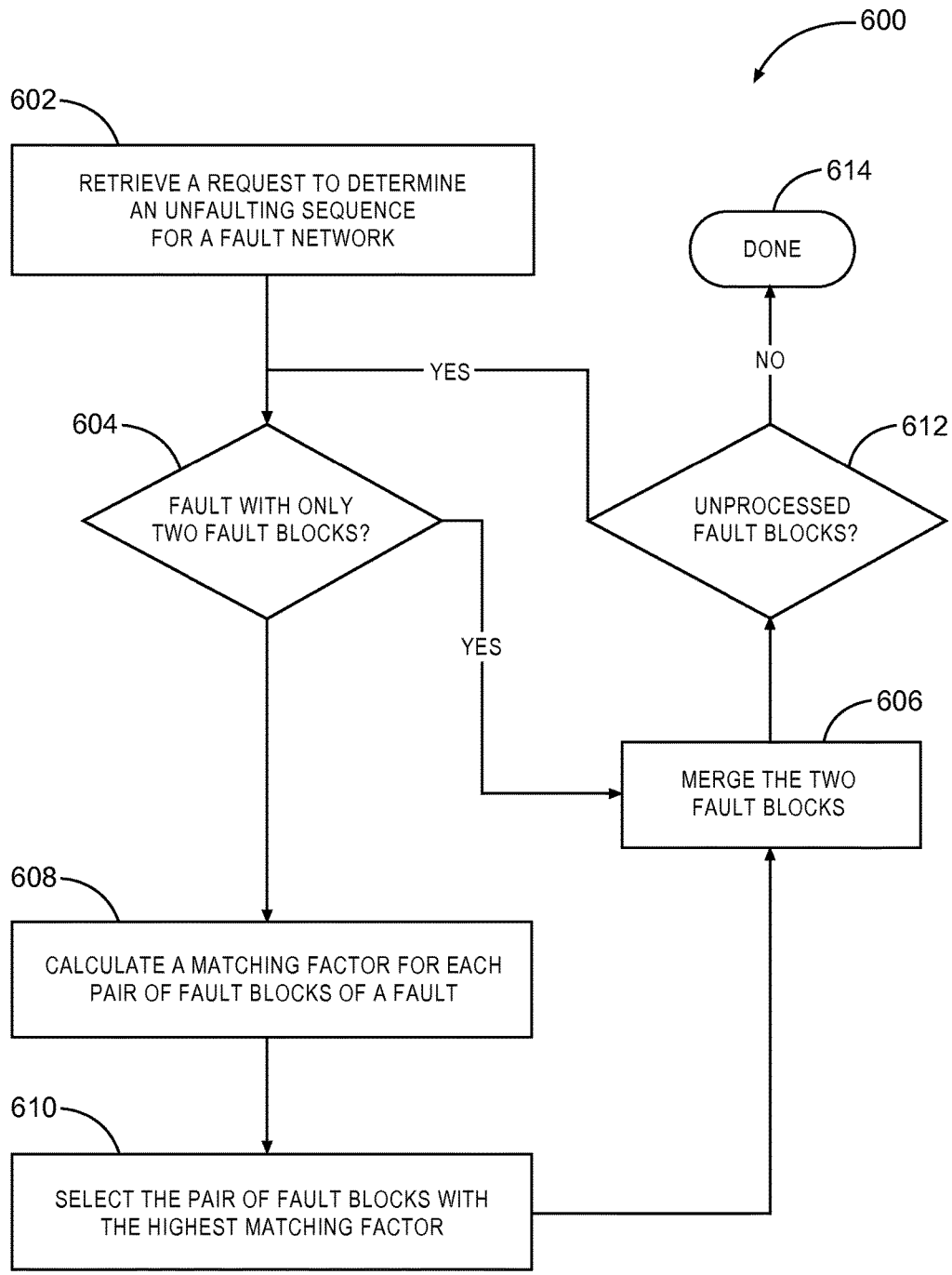
FIG. 6 illustrates a flowchart of a method of a method that may be used to determine a sequence of fault blocks to unfault in a fault network.

FIG. 6 is a flowchart of a method 600, that may be used to determine a sequence of fault blocks to unfault in a fault network that expands upon the algorithm above. In operation 602, a request may be received to determine an unfaulting sequence for a fault network. In some examples, the request identifies or includes data representing the fault network. For example, the data may be the 3D model of a geometric formation and data structures that describe the faults and their associated fault blocks.

In some examples, at operation 602, a determination is made if a fault exists with only two fault blocks on each side of the fault. For example, a table of faults in the fault network may be examined to determine the number of fault blocks along-side each fault. An example table may be look like:

| Fault Identifier | Number of Fault Blocks | Fault Block Identifiers |
|---|---|---|
| A | 4 | B1, B2, B3, B4 |
| B | 2 | B4, B5 |
| C | 3 | B1, B7, B8 |

Other data structure may be used without departing from the scope of this disclosure. As seen, fault B only has two fault blocks (B1, B2). Thus, the method may flow to operation 606 where the two fault blocks are merged. In fault networks where more than one fault that has only two fault blocks, any order of unfaulting may be used (e.g., random, sequential). After, the merger, the table may be updated to reflect the merger of the two blocks and may appear as:

| Fault Identifier | Number of Fault Blocks | Fault Block Identifiers |
|---|---|---|
| A | 4 | B1, B2, B3, b4_b5 |
| C | 3 | B1, B7, B8 |

In various examples, after a merger, a check may be made to determine if there are unprocessed fault blocks (612). Continuing the example above, there are still fault blocks that have not been merged and thus, flow continues back to operation 604 where the check fails as there is no longer a fault with only two fault blocks.

In various examples, a matching factor may be calculated for each pair of fault blocks of a fault (608) across all faults in the fault network. A matching factor may be based on three sub-factors: the angle between both sides of a fault polygon, the ratio of fault block overlap along the fault polygon length, and the absolute overlapped length. These sub-factors are discussed in more detail below.

Figure 7:
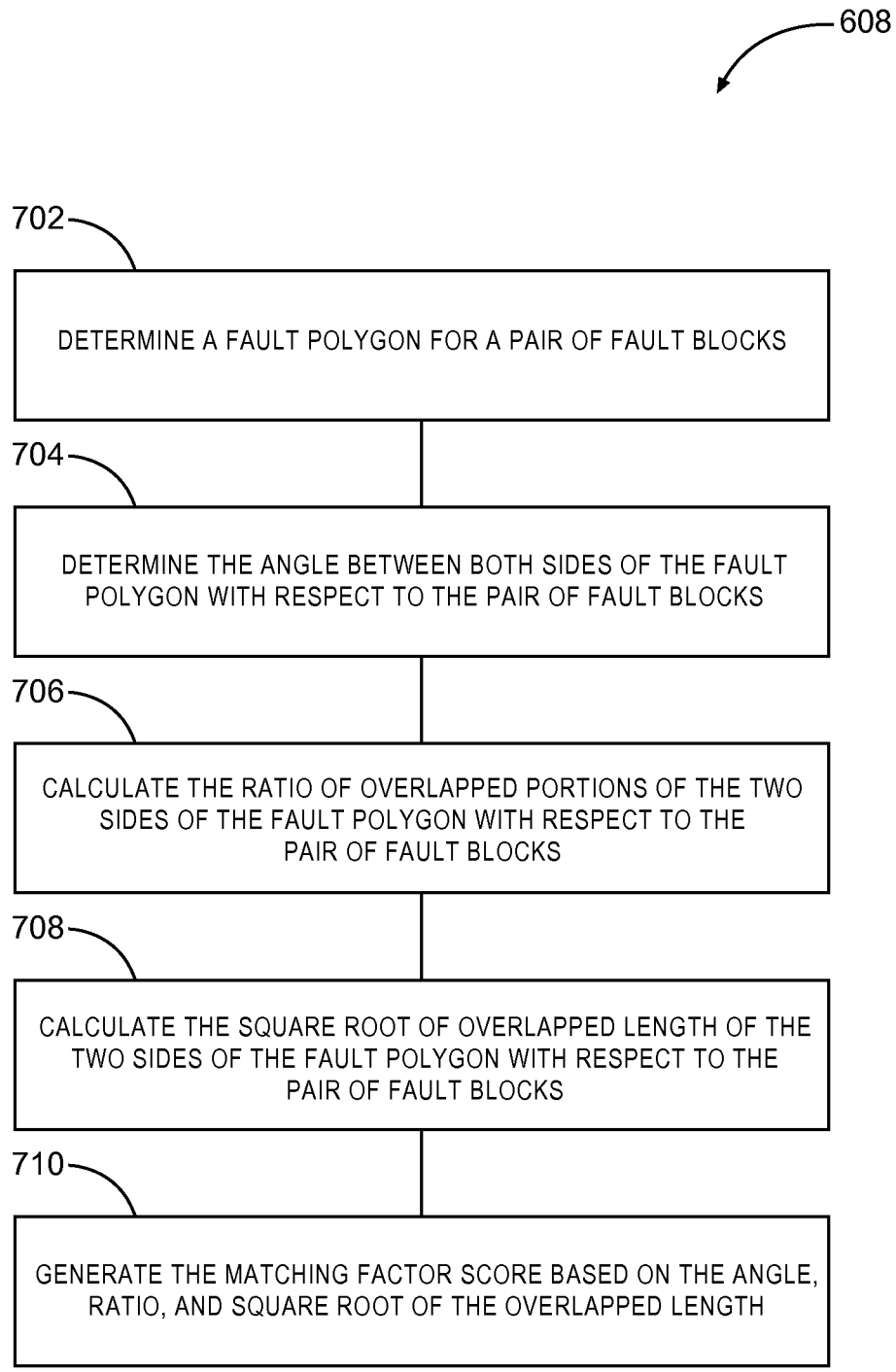
FIG. 7 illustrates a flowchart of a method of calculating a matching factor for a pair of fault blocks, according to an example embodiment.
Figure 8:
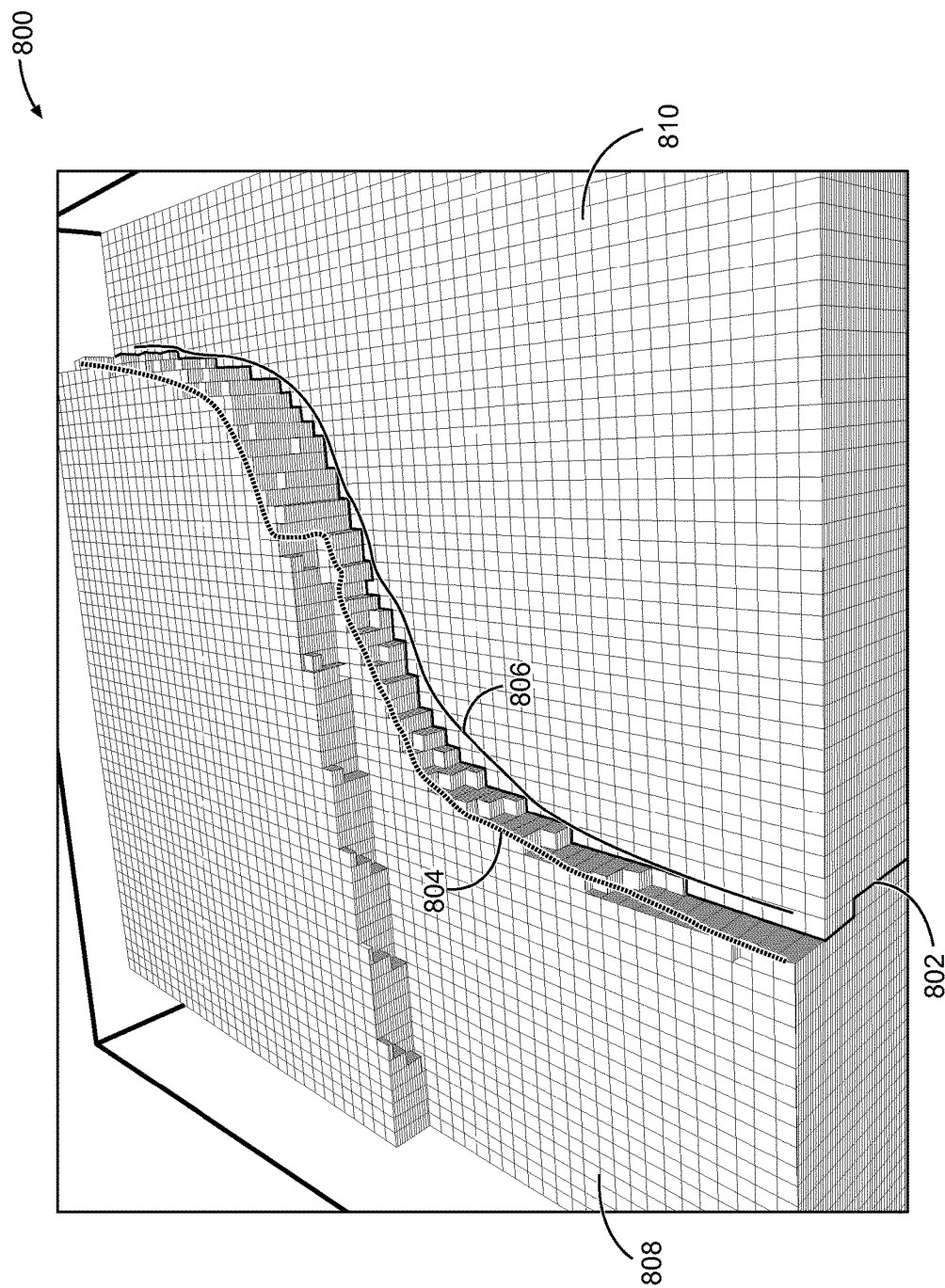
FIG. 8 is a diagram of two fault boundaries, according to an example embodiment.

FIG. 7 illustrates a flowchart 700 of a method of calculating a matching factor for a pair of fault blocks, according to some examples. In some examples, a fault polygon is determined for a pair of fault blocks (702). A fault polygon may be considered the region between two fault blocks that outline the fault between two fault blocks above the top layer of one of the fault blocks. For example, as illustrated in FIG. 8, two sides of a fault polygon running along fault 802 are roughly outlined as lines 804 and 806. Lines 804 and 806 may also be considered the fault boundaries for fault blocks 808 and 810, respectively. Accordingly, line 804 may be the fault block 808 portion of the fault polygon and line 806 may be the fault block 810 portion of the fault polygon.

In some examples, a fault boundary may be a path through cells of the 3D model closest to the fault for each z-layer of a fault block. For example, line 806 may include a line of cells of fault block 810 that are adjacent to fault 802. Similarly, line 808 may include a line of cells of fault block 808 that are adjacent to the other side of the fault. In some examples, the lines may follow the highest (e.g., highest Z value) cell that is adjacent to fault 802. In various examples, a data structure representing the fault boundary may include a series of [X, Y, Z] coordinates tracing the fault boundary. In various examples the [X, Y, Z] coordinates are smoothed into a curved line according to a smoothing algorithm (e.g., least-squares).

Figure 9:
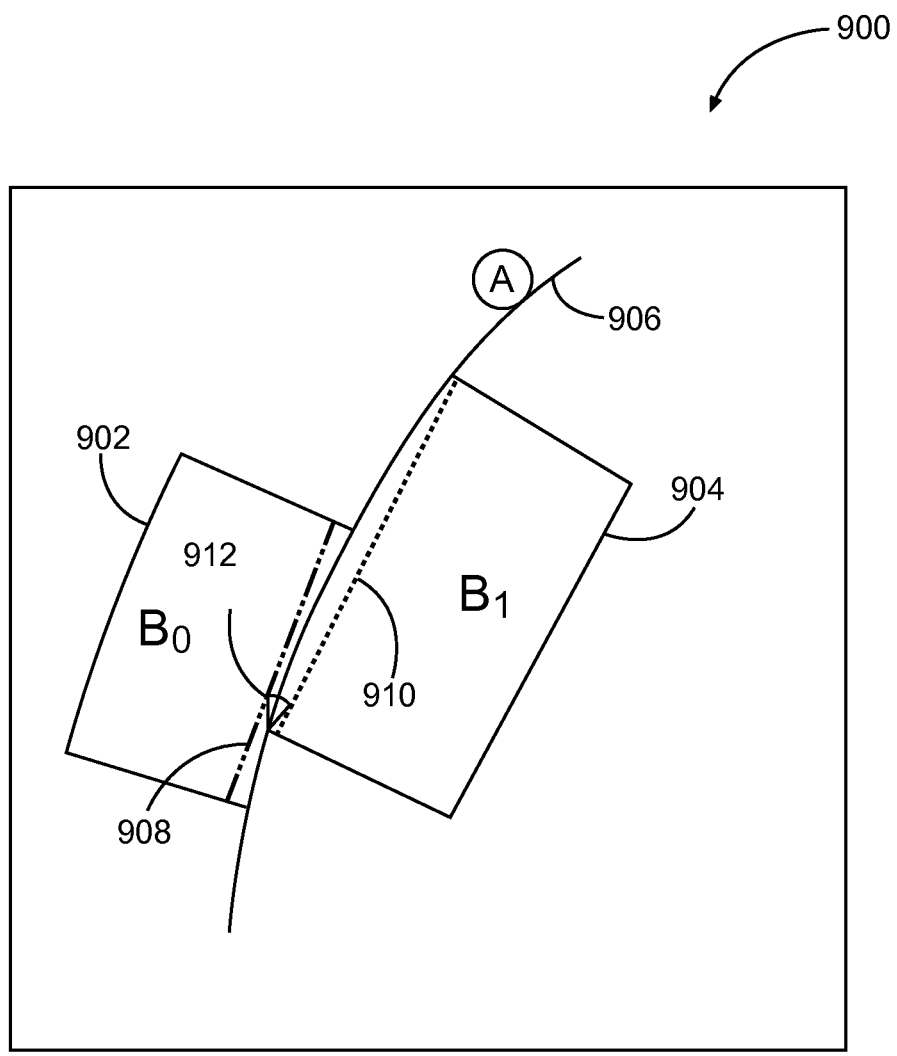
FIGS. 9-10 are diagrams of fault topologies, according to example embodiments.

FIG. 9 illustrates a top-view of simplified fault topology 900 including fault blocks 902 and 904 and fault 906. A fault polygon is illustrated made up of fault polygon portions 908 and 912 for fault blocks 902 and 904, respectively. Fault polygon portions may also be considered fault boundaries in some examples. The angle between both sides of the fault polygon with respect to the pair of fault blocks is determined (704). To determine the angle between the sides of the fault polygon a straight line may be calculated for each of the two sides of the fault polygon (e.g., the fault boundaries for the fault blocks). For example, referring back to FIG. 9, a least square fitting may be applied to fault polygon portion 908 to obtain a straight line (e.g., using the [X, Y] coordinates of the fault polygon portion as the input points). Similarly, a least square fitting may be applied to fault polygon portion 910 to obtain a second straight line. Then, an angle may be calculated between the two straight lines (e.g., angle 912). An angle factor may be defined for use in the matching factor as:

$$\alpha = (\cos \beta)^2$$

where $\beta$ is the angle between the two least square lines.

In various examples, the ratio of overlapped portion of the two sides of the fault polygon with respect to a pair of fault blocks may be calculated (706). In some examples, an overlapped portion means that on opposite sides of a given point along a fault, there is a cell from one of the two fault blocks. Or put another way, a check may be made at each point [X, Y] coordinate, along the fault polygon portion of the first of the fault blocks to determine if an adjacent cell in the X or V direction is a cell of the other fault block. This may be done, for example by iterating through a data structured representing the fault polygon to determine the [X, Y] cells of the portion of the fault polygon of the first fault block. For each of the determined cells, the positions around the cell (e.g., [X+1, Y]; [X−1, Y], [X, Y+1], [X, Y−1]) and see which fault block the position belongs to. If the cell is the other fault block, the length of overlap may be increased by 1. Another embodiment of measuring the area of overlap may include calculation of overlap along a fault plane instead of a fault polygon. Under this condition, the common overlap may be now defined as the common area shared by any two cells along fault plane.

In various examples, the determined overlapped length may be used to determine the ratio of overlapped portions according to the following formula:

$$len = \text{overlap}(FP1_{curve}, FP2_{curve})$$

$$ratio = \frac{len}{\text{Min}(FP1_{curve}, FP2_{curve})}$$

where "len" is the length of overlap as discussed above and $FP1_{curve}$, $FP2_{curve}$ represent the length of the two portions of the fault polygon, lines 908 and 910, for example. The length of the fault polygon portions may be calculated by the number of cells included in the portion.

In various examples, the square root of the overlapped length of the two sides of the fault polygon with respect to the pair of fault blocks is calculated (708). For example, the square root of the overlapped length may be defined as:

$$glen = \sqrt{len}$$

where len is defined as above.

In various examples, a matching factor is generated based on the angle, ratio, and square root of the overlapped length (710). For example the matching factor may be defined as:

$$factor = (\alpha * ratio * glen)$$

where α is the angle factor, ratio is the ratio factor and glen is the length factor. One reason for using the square of the cosine is that the angle factor should drop sharply with an increase in the angle. The square root of the absolute length creates a length factor that should increase slowly when the overlapped length becomes longer. It is also possible to apply a cosine with a power of 4 in with respect to the calculation of a, and then take the square root twice in calculating glen, according to some examples.

Using the above definitions defining a block matching factor, a sequence of fault blocks to unfault in a complex fault topology may be generated.

Referring back FIG. 6, after a matching factor has been calculated for each pair of fault blocks of a fault (608), the pair of fault blocks with the highest matching factor may be selected (610). This pair of fault blocks may then be merged as discussed above. After it is determined at operation 612 that there are no more unprocessed fault blocks (e.g., unfaulted and unmerged blocks) the process may end (614). As can be seen by examining FIG. 6, after each merging in operation 606, a check is again made to determine if there is a fault with only two fault blocks in operation 604. This may be done as after merging a pair of blocks a fault may exist that previously had more than two fault blocks, but now has one.

Figure 10:
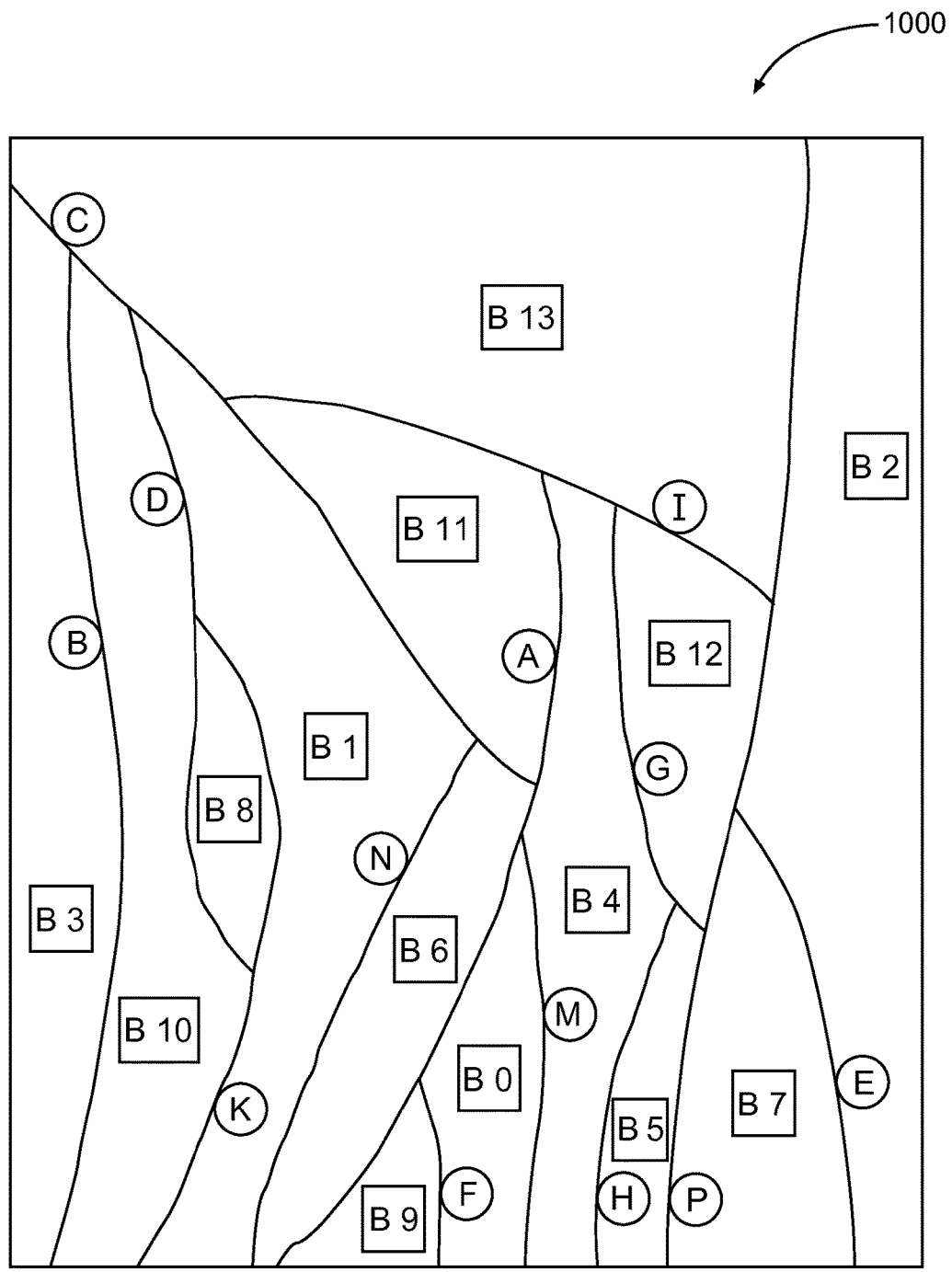

FIG. 10 represents a fault network 1000, according to an example embodiment that may be unfaulted using a sequence generated by the methods discussed herein. For example, fault network 1000 may be unfaulted in the following sequence:

1. fault-F(B9,B0)
2. fault-H(B5, B4)
3. fault-E(B7,B2)
4. fault-B(B3,B10)
5. fault-N(B6,B1)
6. fault-G(b4_b5,B12)
7. fault-M(b9_b0,b4_b5_b12) [now, all interlocked]
8. fault-P(b2_b7,b9_b0_b4_b5_b12)
9. fault-C(b6_b1,B11)
10, fault-P(B13, b2_b7_b9_b0_b4_b5_b12)
11. fault-A(b6_b1_b11, b13_b2_b7_b9_b0_b4_b5_b12)
12. fault-D(b3_b10, B8)
13. fault-K(b3_b10_b8, b6_b1_b11_b13_b2_b7_b9_b0_b4_b5_b12)
14. done: (b3_b10_b8_b6_b1_b11_b13_b2_b7_b9_b0_b4_b5_b12)

Figure 11:
FIGS. 11, 12A, and 12B are visualizations of a fault network after unfaulting, according to example embodiments.
Figure 12A:
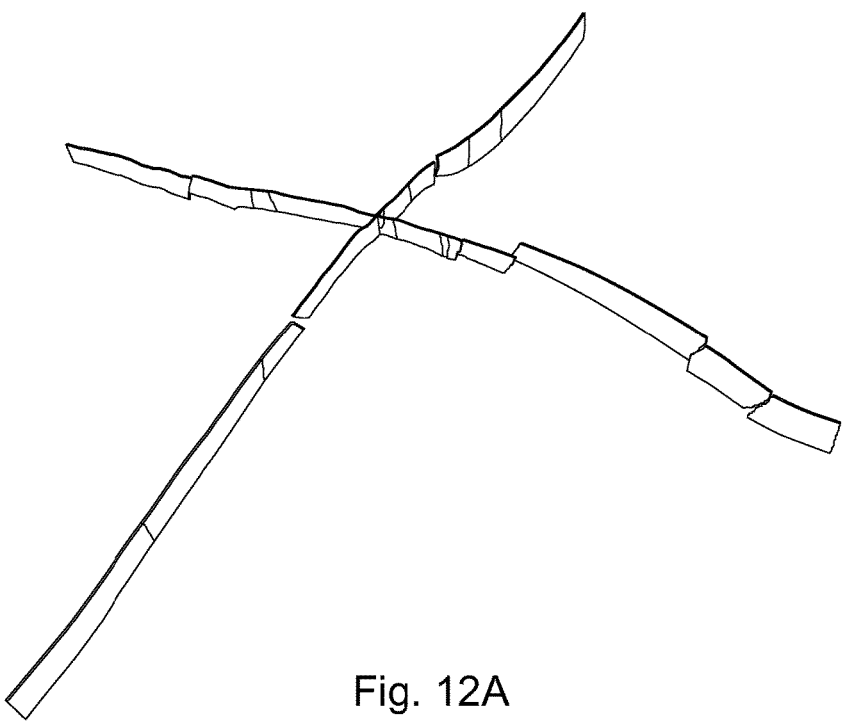
Figure 12B:
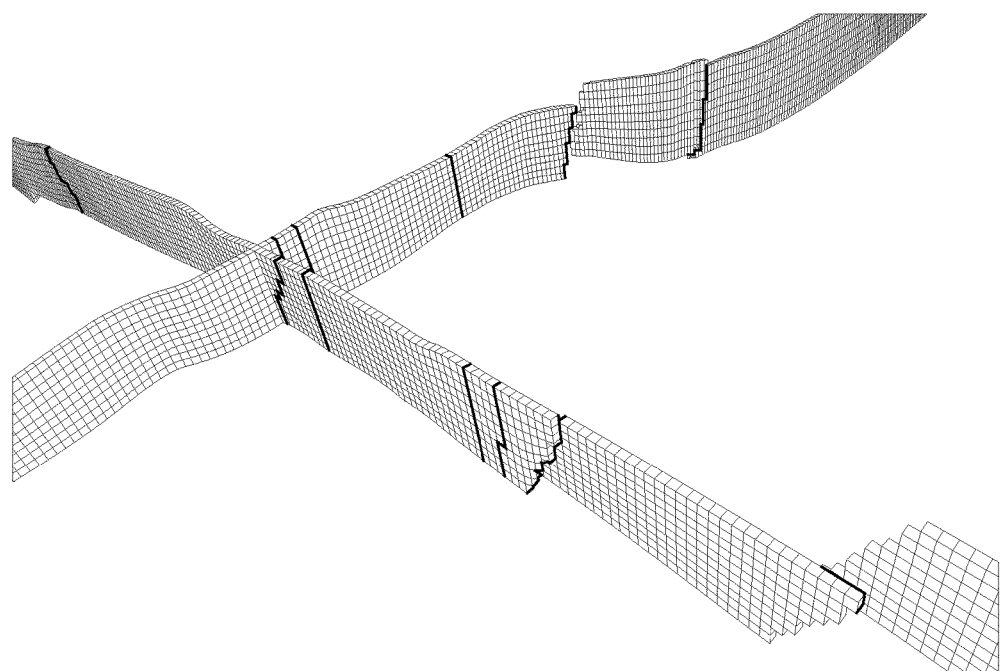

FIGS. 11, 12A, and 12B illustrate various views of fault network 1000 after the unfaulting process.

In various examples, the operations discussed above with respect to generating an unfaulting sequence and unfaulting 302 may be stored on a computer-readable storage device as instructions. In an example, the storage device is a non-transitory medium. The instructions may be executed on at least one processor of a computing system. In an example, the execution of the instructions is distributed among a plurality of processors. The processors may be general purpose processors or specialized processors such as graphical processing units. The processors may be located in the same computing system or distributed among a plurality of computing systems.

In an example, a storage device of the computing system may store the data structures discussed herein. Storage may also be distributed among a plurality of storage devices. In various examples, the data structures are stored in a database (e.g., relational, non-relational, flat file, etc.), structure file (e.g., XML) or other storage format.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Figure 13:
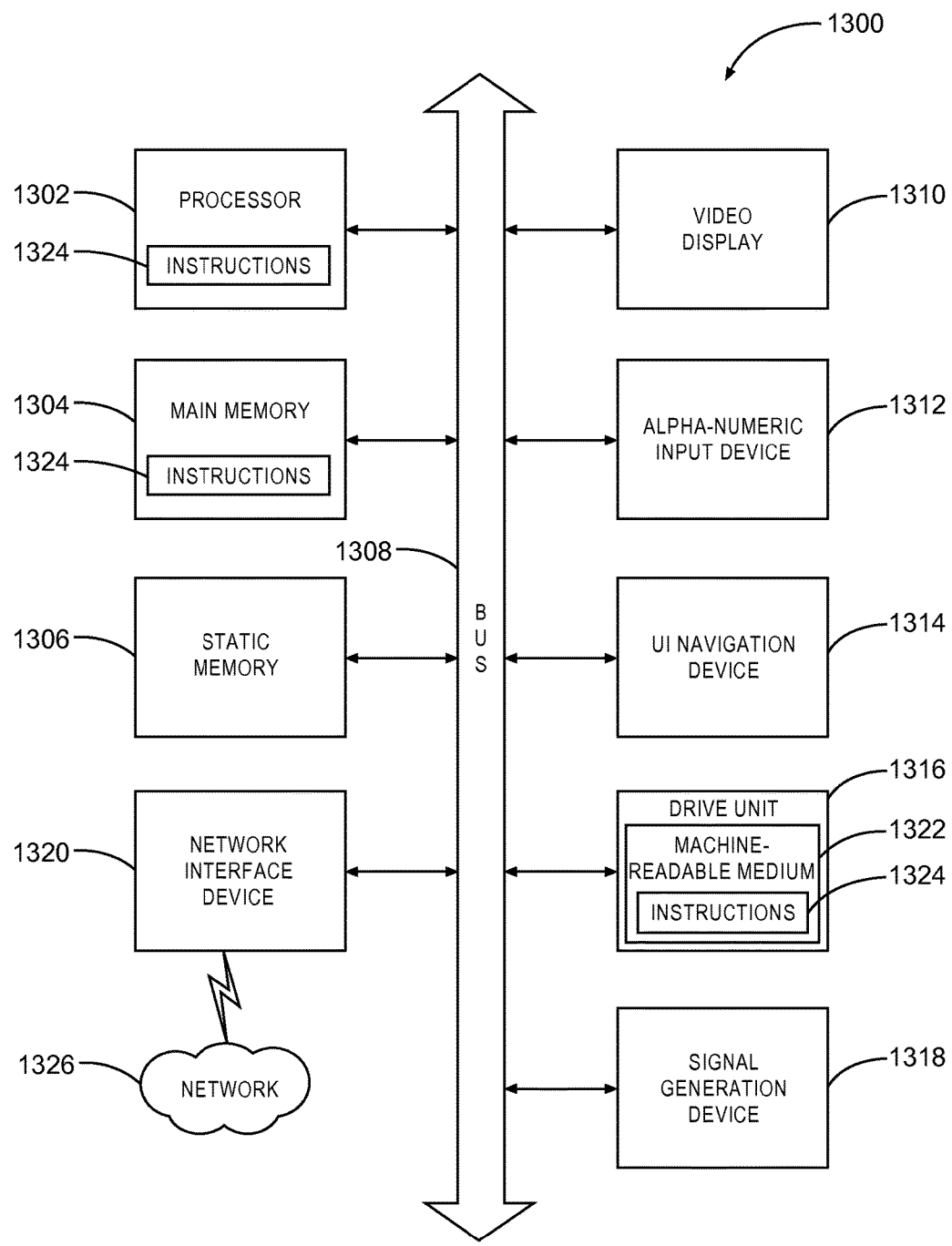
FIG. 13 is a block diagram of machine in the example form of a computer system within which a set instructions, for causing the machine to perform any one or more of the methodologies discussed herein, may be executed.

FIG. 13 is a block diagram of a machine in the example form of a computer system 1300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

The disk drive unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software, Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of global grid building for complex fault networks comprising:

retrieving, by at least one processor, one or more data structures stored on a storage device communicatively coupled to the at least one processor, the one or more data structures identifying a plurality of faults in a three-dimensional (3D) model of a geographical formation and a plurality of fault blocks for each fault in the plurality of faults, the 3D model including a cell index domain representing the plurality of fault blocks in a 3D area;

for the plurality of fault blocks identified in the one or more data structures for each fault in the 3D model, determining selection rules for an unfaulting sequence used to merge the faults blocks for each fault in the cell index domain of the 3D model, the determining by:

determining, using the at least one processor, a fault polygon for a pair of fault blocks on opposite sides of the fault;

determining an angle between the pair of fault blocks for a portion of the fault polygon overlapped by the pair of fault blocks;

determining a ratio of the overlapped portion of the fault polygon with respect to the pair of fault blocks;

determining a length of the overlapped portion; and calculating a matching factor between the respective pair of fault blocks, based on the angle, the ratio and the length, wherein the matching factor for each pair of fault blocks is to be applied as one of the selection rules for determining which pair of fault blocks is next to be merged in the unfaulting sequence;

applying the selection rules to select and merge a pair of fault blocks into an unfaulted block at each step of the unfaulting sequence for each fault of the plurality of faults in the 3D model until there is a global grid with no fault throws, wherein cells associated with the pair of fault blocks in the cell index domain are updated to represent an alignment of the pair of fault blocks merged into the unfaulted block; and updating the one or more data structures to indicate the merging of fault blocks for each fault in the 3D model of the geographical formation.

2. The method of claim 1, wherein determining a fault polygon of the respective pair of fault blocks comprises:

determining two fault boundaries with respect to the fault, one for each of the respective pair of fault blocks.

3. The method of claim 2, wherein calculating a matching factor between the respective pair of fault blocks based on the fault polygon comprises:

multiplying an angle factor by a ratio factor by a length factor, wherein the angle factor, ratio factor, and length factor are calculated based on the two fault boundaries.

4. The method of claim 3, wherein the angle factor is based on:

calculating straight lines for each of the fault boundaries; and determining the angle between the straight lines.

5. The method of claim 3, wherein the ratio factor is based on:

determining the length of overlap between the two fault boundaries with respect to the fault; and dividing the length of the overlap by the smaller of the two lengths of the fault boundaries.

6. The method of claim 3, wherein the length factor is based on:

determining the length of overlap between the two fault boundaries with respect to the fault.

7. The method of claim 1, further comprising:

iterating through the one or more data structures to identify a fault with only two fault blocks; and updating the one or more data structures to indicate a merger of the fault blocks associated with the fault identified with only two fault blocks.

8. The method of claim 1, wherein the updating of the one or more data structures to indicate a merger of the fault blocks associated with the fault identified with only two fault blocks is done before a matching factor is calculated.

9. The method of claim 1, wherein updating the one or more data structures to indicate the selected pair of fault blocks has been merged includes:

replacing fault block entries in the one or more data structures associated with the selected pair of fault blocks with a single fault block entry.

10. A non-transitory computer-readable storage medium having processor-executable instructions stored thereon, which when executed by at least one processor, cause the at least one processor to perform operations for:

retrieving one or more data structures stored on a storage device communicatively coupled to the at least one processor, the one or more data structures identifying a plurality of faults in a three-dimensional (3D) model of a geographical formation and a plurality of fault blocks for each fault in the plurality of faults, the 3D model including a cell index domain representing the plurality of fault blocks in a 3D area;

for the plurality of fault blocks identified in the one or more data structures for each fault in the 3D model, determining selection rules for an unfaulting sequence used to merge the faults blocks for each fault in the cell index domain of the 3D model, the determining by:

determining a fault polygon for a pair of fault blocks on opposite sides of the fault;

determining an angle between the pair of fault blocks for a portion of the fault polygon overlapped by the pair of fault blocks;

determining a ratio of the overlapped portion of the fault polygon with respect to the pair of fault blocks;

determining a length of the overlapped portion; and calculating a matching factor between the respective pair of fault blocks based on the angle, the ratio and the length, wherein the matching factor for each pair of fault blocks is to be applied as one of the selection rules for determining which pair of fault blocks is next to be merged in the unfaulting sequence;

applying the selection rules to the plurality of faults in the 3D model to select and merge a pair of fault blocks into an unfaulted block at each step of the unfaulting sequence for each fault of the plurality of faults in the 3D model until there is a global grid with no fault throws, wherein cells associated with the pair of fault blocks in the cell index domain are updated to represent an alignment of the pair of fault blocks merged into the unfaulted block; and updating the one or more data structures to indicate the merging of fault blocks for each fault in the 3D model of the geographical formation.

11. The non-transitory computer-readable storage medium of claim 10, wherein the operation of determining a fault polygon of the respective pair of fault blocks comprises:

determining two fault boundaries with respect to the fault, one for each of the respective pair of fault blocks.

12. The non-transitory computer-readable storage medium of claim 11, wherein the operation of calculating a matching factor between the respective pair of fault blocks based on the fault polygon comprises:

multiplying an angle factor by a ratio factor by a length factor, wherein the angle factor, ratio factor, and length factor are calculated based on the two fault boundaries.

13. The non-transitory computer-readable storage medium of claim 12, wherein the angle factor is based on:

calculating straight lines for each of the fault boundaries; and determining the angle between the straight lines.

14. The non-transitory computer-readable storage medium of claim 12, wherein the ratio factor is based on:

determining the length of overlap between the two fault boundaries with respect to the fault; and dividing the length of the overlap by the smaller of the two lengths of the fault boundaries.

15. The non-transitory computer-readable storage medium of claim 12, wherein the length factor is based on:

determining the length of overlap between the two fault boundaries with respect to the fault.

16. A system comprising:
one or more processors;
a memory coupled to the one or more processors and having instruction stored thereon; and
wherein the instructions, when executed by the one or more processors, cause the one or more processors to perform operations for:
retrieving one or more data structures stored on the storage device, the one or more data structures identifying a plurality of faults in a three-dimensional (3D) model of a geographical formation and a plurality of fault blocks for each fault in the plurality of faults, the 3D model including a cell index domain representing the plurality of fault blocks in a 3D area;
for the plurality of fault blocks identified in the one or more data structures for each fault in the 3D model, determining selection rules for an unfaulting sequence used to merge the faults blocks for each fault in the cell index domain of the 3D model, the determining by:
determining a fault polygon for a pair of fault blocks on opposite sides of the fault;
determining an angle between the pair of fault blocks for a portion of the fault polygon overlapped by the pair of fault blocks;
determining a ratio of the overlapped portion of the fault polygon with respect to the pair of fault blocks;
determining a length of the overlapped portion; and
calculating a matching factor between the respective pair of fault blocks based on the angle, the ratio and the length, wherein the matching factor for each pair of fault blocks is to be applied as one of the selection rules for determining which pair of fault blocks is next to be merged in the unfaulting sequence;
applying the selection rules to select and merge a pair of fault blocks into an unfaulted block at each step of the unfaulting sequence for each fault of the plurality of faults in the 3D model until there is a global grid with no fault throws, wherein cells associated with the pair of fault blocks in the cell index domain are updated to represent an alignment of the pair of fault blocks merged into the unfaulted block; and
updating the one or more data structures to indicate the merging of fault blocks for each fault in the 3D model of the geographical formation.

17. The system of claim 16, wherein the operation of determining a fault polygon of the respective pair of fault blocks comprises:
determining two fault boundaries with respect to the fault, one for each of the respective pair of fault blocks.

18. The system of claim 17, wherein the operation of calculating a matching factor between the respective pair of fault blocks based on the fault polygon comprises:
multiplying an angle factor by a ratio factor by a length factor, wherein the angle factor, ratio factor, and length factor are calculated based on the two fault boundaries.

19. The system of claim 18, wherein the angle factor is based on:
calculating straight lines for each of the fault boundaries; and
determining the angle between the straight lines.

20. The system of claim 18, wherein the ratio factor is based on:
determining the length of overlap between the two fault boundaries with respect to the fault; and
dividing the length of the overlap by the smaller of the two lengths of the fault boundaries.

21. The system of claim 18, wherein the length factor is based on:
determining the length of overlap between the two fault boundaries with respect to the fault.

* * * * *

UNITED STATES PATENT AND TRADEMARK OFFICE
CERTIFICATE OF CORRECTION

PATENT NO. : 10,345,482 B2
APPLICATION NO. : 14/913883
DATED : July 9, 2019
INVENTOR(S) : Zitao Xu et al.

It is certified that error appears in the above-identified patent and that said Letters Patent is hereby corrected as shown below:

In the Specification

Column 2, Line 57, change "Lea" to -- i.e. --

Column 4, Line 4, change "unfauit" to -- unfault --

Column 4, Line 49, change "91" to -- B1 --

Column 4, Line 50, change "b6, in" to -- b6. In --

Column 5, Line 22, change "the" to -- then --

Column 6, Line 64, change "V" to -- Y --

Column 7, Line 9, add -- a -- after "along"

Column 7, Line 38, change "glen" to -- *glen* --

Column 7, Line 45, change "a" to -- *a* --

Column 7, Line 46, change "glen" to -- *glen* --

Signed and Sealed this
Twenty-fourth Day of December, 2019

Andrei Iancu
*Director of the United States Patent and Trademark Office*